US006950015B2

(12) United States Patent
Lo

(10) Patent No.: US 6,950,015 B2
(45) Date of Patent: Sep. 27, 2005

(54) OVER-RUNNING INDICATOR STRUCTURE

(76) Inventor: Jui-Yang Lo, No. 2, Alley 27, Lane 143, Yuanshan Rd., Junghe City, Taipei (TW)

( * ) Notice: Subject to any disclaimer, the term of this patent is extended or adjusted under 35 U.S.C. 154(b) by 116 days.

(21) Appl. No.: 10/636,704

(22) Filed: Aug. 8, 2003

(65) Prior Publication Data

US 2005/0028589 A1 Feb. 10, 2005

(51) Int. Cl.[7] .......................... B60Q 1/00; G01P 3/00; G08B 5/36

(52) U.S. Cl. .......................... 340/441; 3/499; 340/457; 340/815.73

(58) Field of Search .................. 73/499; 340/438–439, 340/441, 456–457, 815.73, 980

(56) References Cited

U.S. PATENT DOCUMENTS 4,174,766 A * 11/1979 Kalogerson ................. 340/439
4,347,496 A * 8/1982 Kubalak et al. ............ 340/439
4,873,891 A * 10/1989 Guanciale .................... 74/625
5,269,187 A * 12/1993 Hanson ...................... 340/439
5,576,687 A * 11/1996 Blank et al. ................ 340/438
6,137,399 A * 10/2000 Westberg et al. ........... 340/441
2003/0110873 A1 * 6/2003 Durnen ...................... 73/866.5

* cited by examiner

*Primary Examiner*—Hezron Williams
*Assistant Examiner*—John C Hanley
(74) *Attorney, Agent, or Firm*—Rosenberg, Klein & Lee

(57) ABSTRACT

An improved over-running indicator structure essentially comprises an upper housing, a lower housing, a circuit board and a fixing support; the upper housing and the lower housing are firmly connected by a lock device, and the lower housing is fixed on the fixing support; a circuit board is set between the upper housing and the lower housing, the circuit board is configured with a light emitter, a screen and a button, the circuit board uses a transmission line to connect with a tachometer; a driver can use the button to set the rotational speed for showing the rotational speed which is set by the driver on the screen, when the rotational speed of the engine exceeds the rotational speed that is set by the driver, the light emitter disposed on the circuit board shines and radiates the light thereof through the arc surface of the upper housing, thus, the driver feel no constrained to any angle for being readily aware of the optimal shifting time to acquire the best power from engine.

2 Claims, 5 Drawing Sheets

OVER-RUNNING INDICATOR STRUCTURE

BACKGROUND OF THE INVENTION

1. Field of the Invention

The subject invention is directed to an over-running indicator structure for an automobile, and in particular, to an over-running indicator structure for readily providing a driver with an ineluctable visual indicator of the optimal time and engine revolutions per minute to shift gears.

2. Description of the Prior Art

In automotive racing, speed is necessarily emphasized, with the goal being to reach and maintain the optimal speed. In addition to such factors as the wind resistance of the motor vehicle, the rotational speed of the engine is a key factor that is critical to a car and driver's performance. A driver can realize the automobile's optimal power and racing speed by shifting gears at the optimal rotational speed (RPM's) of the engine, thus making understandable why tachometer indicators enjoy good marketability.

Referring to FIG. 1, a schematic diagram shows a conventional tachometer indicator structure of the prior art. A conventional tachometer indicator structure comprises a housing 1 and a mounting support 2, wherein the housing 1 includes a circuit board 11 that is configured with a light emitter 111. The back of the housing is configured with a a parameter setting control 12 for a user to set a chosen parameter threshold; the front of the housing 1 is configured with a colored screen 13.

Referring to FIG. 2, a schematic diagram shows a conventional tachometer indicator structure. When the engine RPM's exceed the predetermined RPM's, the light emitter 111 on the circuit board 11 shines and generates a bright color emitted through the small flat screen 13 for signaling to the driver the optimal shifting time, but the screen 13 must be set at an angle that can be readily noticed by the driver in order to achieve the best effect. The problem is that it is often quite difficult to choose the place for positioning the screen 13 in the automobile so that it is readily visible to the driver without also interfering with the driver's view of the road; the driver will too often miss the optimal shifting time as a result of the limitations and disadvantages of the prior art.

The inventor has noticed the various disadvantages associated with conventional over-running indicator structures and has strived to improve upon them. After having carried out an intensive study for many years, the inventor has successfully developed the over-running indicator structure of the subject invention.

SUMMARY OF THE INVENTION

An object of the invention is to provide an over-running indicator structure for readily providing an includable visual signal to a driver of the optimal time to shift gears.

Another object of the invention is to provide an over-running indicator structure whose function is not adversely affected by its mounting position relative to the driver.

Another object of the invention is to provide an over-running indicator structure that includes a variety of advantages such as uncomplicated construction, convenience of use by a driver, and the like.

The over-running indicator structure that is able to achieve the objectives of the invention as described above is composed of an upper housing that is substantially hemispherical and light-transmissive, a lower housing, a circuit board and a mounting support. The upper housing and the lower housing—each approximately hemispherical in the preferred embodiment—are firmly connected to each other by a at least two screws. The bottom of the lower housing is formed with a pair of mounting logs that extend or protrude downward, each of said pair of mounting legs formed with a mounting hole therethrough.

The mounting support includes a pair of mounting brackets extending upwardly to matingly juxtapose with the mounting legs. The mounting brackets are either formed as part of the mounting support or alternatively, fixedly attached to the top of the mounting support. Each of the pair of mounting brackets is formed so as to define an axle hole positioned centrally therethrough with the pair of axle holes co-axial with the respective pair of mounting holes. Both the axle holes and the mounting holes are adapted to accommodate a removable bolt-like axle that adjustably connects the lower housing to the mounting plate. The bolt-like axle can be reversibly tightened or otherwise secured so as to thereby hold the over-running indicator device stationary with respect to the vehicle.

The lower housing is adjustably seated in the mounting brackets by the pair of mounting legs that extend downward from the inferior surface of the lower housing from which they are either formed or fixedly attached.

A circuit board is seated in the lower housing, in close proximity to a plane substantially defined by the joining between the upper housing and the lower housing. The circuit board is provided with a light emitter, a data screen and a plurality of control buttons. At least one electronic transmission cable connects at one end to the circuit board and at its other end with the vehicle's tachometer for receiving an RPM data signal from the tachometer. A driver uses a control button to set the desired rotational speed; the pre-determined RPM which is set by the driver is shown on the data screen. Once the engine RPM's exceed the pre-determined RPM set by the driver, the light emitter disposed on the circuit board is activated and gives off light. The emitted light shines through the upper housing with its light-transmissive arcuate surface thereby sending an ineluctable visual signal to the driver of the optimal gear shifting time to realize the best power from engine. The ineluctable visual signal is readily noticeable by the driver regardless of the relative positions of the driver and the mounted over-running indicator device due to the fact that the indicator light signal is emitted through the roughly hemispherical light-transmissive upper housing.

DETAILED DESCRIPTION OF THE PREFERRED EMBODIMENT

Figure 1:
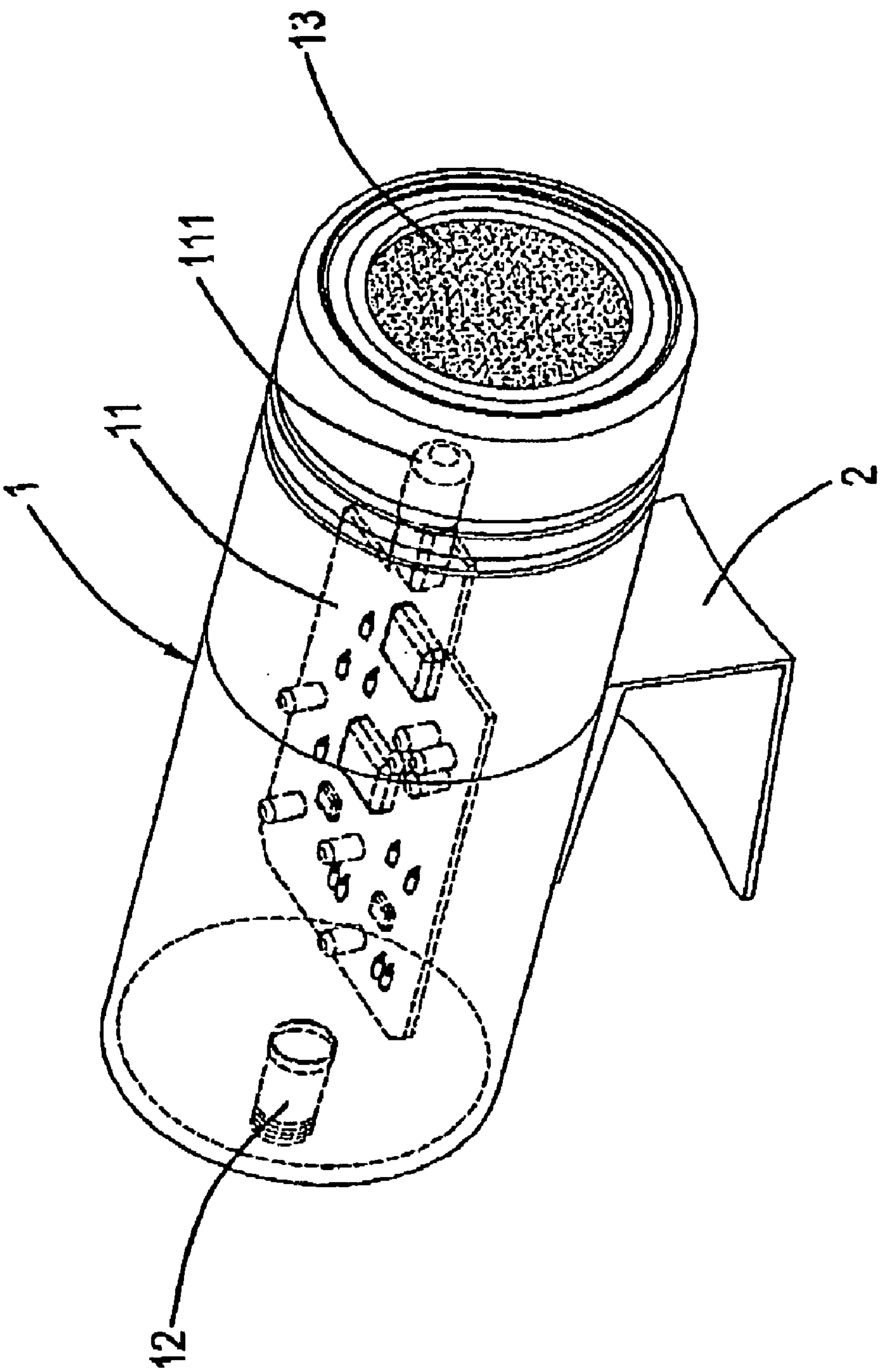
FIG. 1 is a perspective view of the prior art, schematically showing a conventional tachometer indicator.
Figure 2:
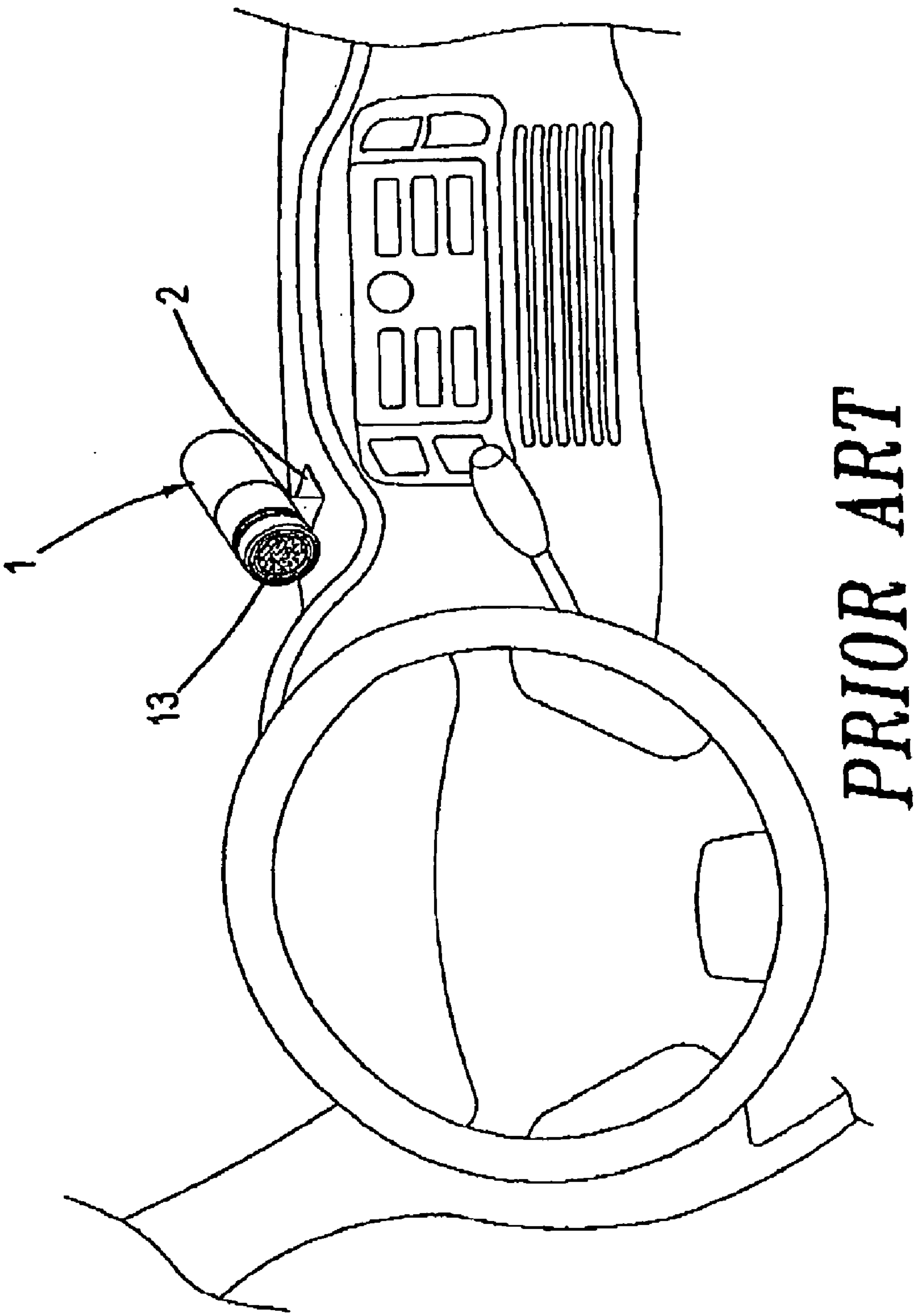
FIG. 2 is a schematic perspective view of the prior art, further showing a conventional tachometer indicator mounted on a vehicle dashboard.
Figure 3:
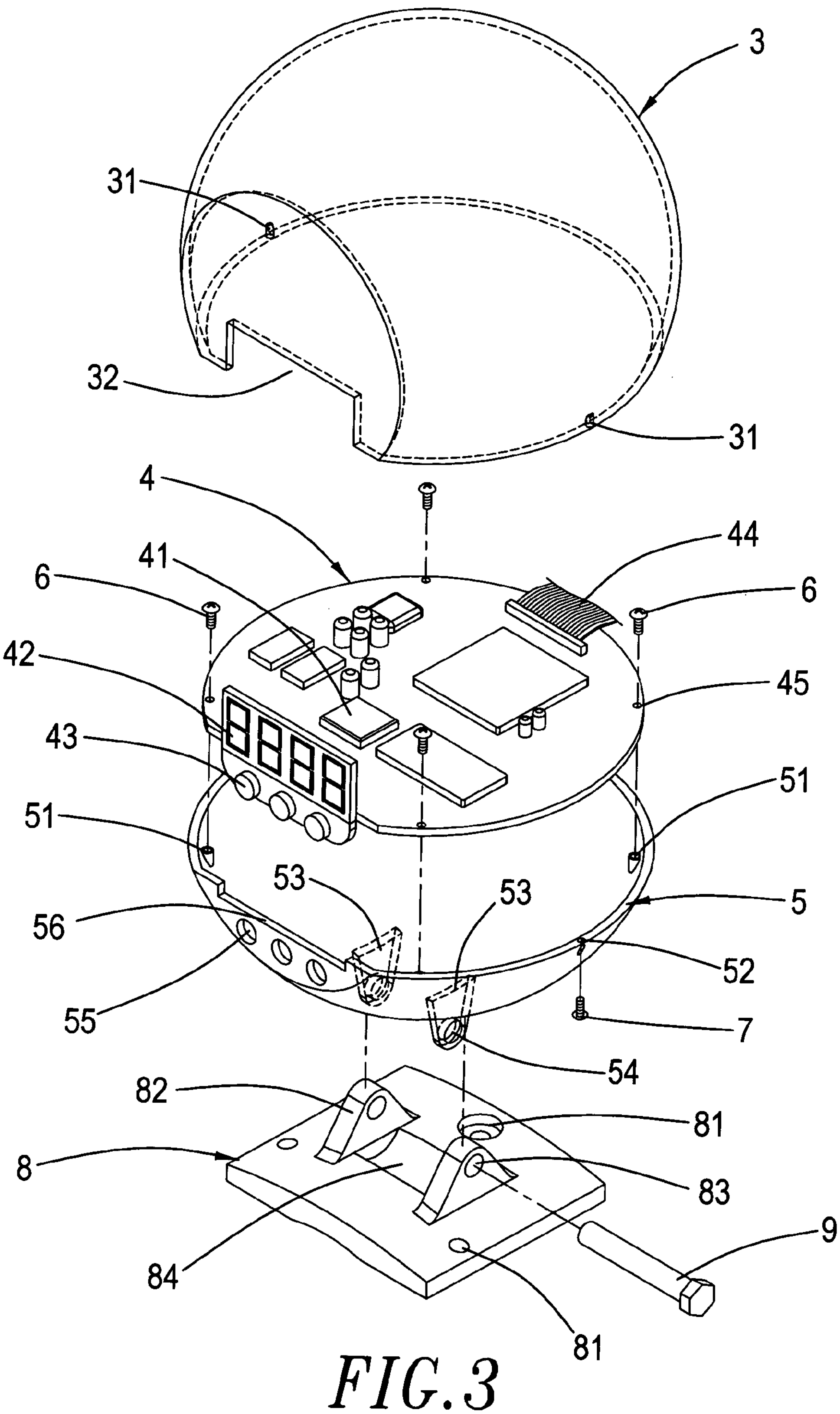
FIG. 3 is a three-dimensional exploded schematic view of over-running indicator structure according to the subject invention.
Figure 4:
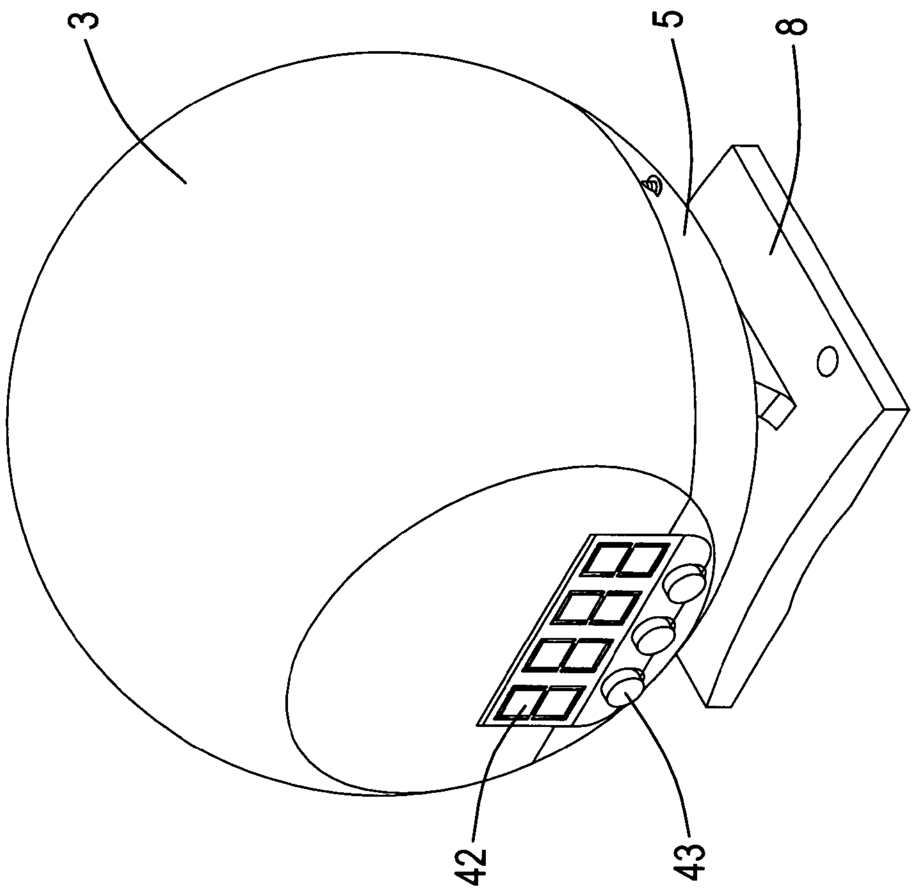
FIG. 4 is a perspective view of an over-running indicator structure according to the subject invention; and, FIG. 5 is perspective view of an over-running indicator structure according to the subject invention, mounted on a vehicle dashboard with light emissions schematically illustrated.

Referring to FIGS. 3 and 4, the structure of the subject invention comprises:

an upper housing 3, substantially hemi-spherical in shape and composed of light-transmissive material, having one side or quadrant of the upper housing 3 formed with an upper gap 32, and further provided with a rim formed with at least a pair of threaded holes 31;

a circuit board 4, provided with a light emitter 41 that is preferably color changeable, a data screen 42 and a plurality of control buttons 43, and adapted to connectedly receive a transmission cable 44 for electronic data connection to the tachometer and for receiving an engine rotational speed or RPM signal, from the tachometer, the edges of the circuit board 4 further formed with a plurality of board holes 45;

a lower housing 5, with an inner surface formed with a plurality of hollow threaded ribs 51 adjacent to the rim and adapted to receive top screws 6, and with a pair of mounting legs 53 projecting or protruding downward from the bottom of the lower housing 5, each leg formed with a mounting hole 54 therethrough, the front of the lower housing 5 additionally configured with a plurality of button holes 55 adapted to closely encircle the control buttons without juxtaposition, and, a lower gap 56 formed above the plurality of button holes;

and a mounting support 8,

Circuit board 4 seated on the hollow threaded ribs 51 of the lower housing 5 and provided with board holes 45 that correspond to the hollow threaded ribs 51. The plurality of board holes 45 and the respective plurality of hollow threaded ribs 51 are aligned so as to allow the circuit board 4 and the lower housing 5 to be firmly and reversibly connected by rotatingly advancing top screws 6 through the board holes 45 into the threaded mounting ribs 51 of the lower housing 5.

The upper and lower housings 3, 5 are firmly and reversibly connected by rotatingly advancing bottom screws 7 through the screw holes 52 formed along the rim of the lower housing 5 into the threaded holes 31 of the upper housing 3.

When the over-running indicator structure is assembled, the control buttons 43 on the circuit board 4 extend through the respective button holes 55 on the front of the lower housing 5. With the upper housing 3 and the lower housing 5 are firmly connected to each other, the upper gap and lower gap formed in the respective housings are aligned and juxtaposed so as to form an opening with dimensions and shape adapted to surround and frame the data screen 42 seated therein.

Figure 5:
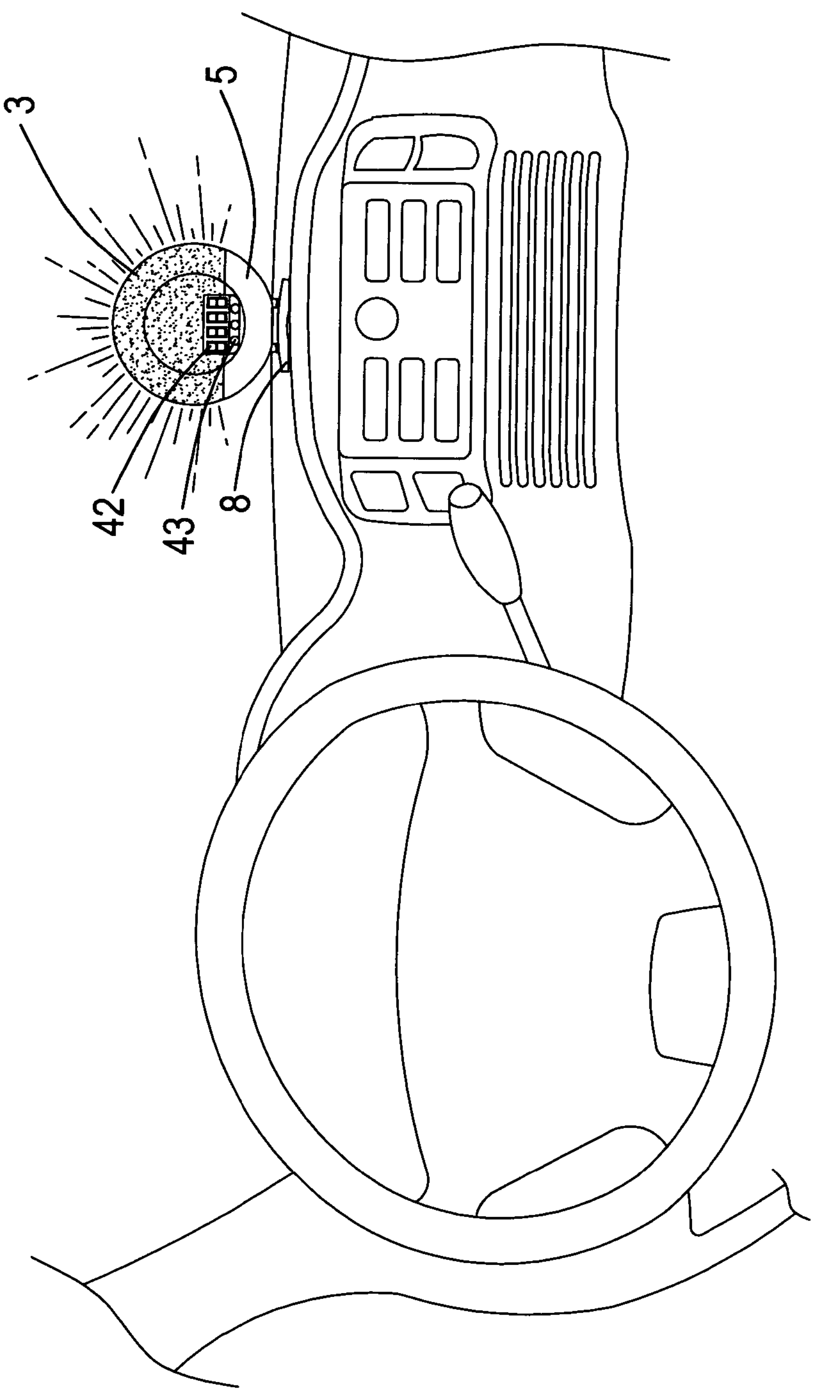

A mounting support 8, configured with a plurality of base through holes 81 to facilitate one possible means of mounting said over-running indicator structure, is further provided with a pair of mounting brackets 82 formed therefrom, or fixedly attached thereto, which project upward so as to juxtapose respectively with the corresponding pair of mounting legs 53 in a manner that aligns the mounting holes 54 with the respective axle holes 83 to reversibly accept a bolt-like axle 9 therethrough; an optional hemi-cylindrical groove 84 formed on the mounting support 8 between the two mounting brackets 82 permits rotation of the lower housing 5 around the axis of the bolt-like axle 9 for those embodiments in which the lower housing 5 would otherwise have such free rotation impeded by the mounting support 8;

FIG. 5 is a schematic view of an embodiment of an over-running indicator structure according to the invention, illustrating how a driver fixedly positions the mounting support 8 at an appropriate position forward of the driver's seat on the dashboard. Once the driver uses the control button 43 to set the desired predetermine engine rotational speed, the predetermined engine RPM, or rotational speed is shown on the data screen 42.

When the actual engine RPM exceeds the predetermined engine RPM that is set by the driver, the light emitter 41 on the circuit board 4 is activated and emits a light, preferably brightly colored to further assure the light signal's ineluctability, through the entire curved surface of the upper housing 3, thus, providing an ineluctable visual signal to the driver that is substantially impossible not to be noticed regardless of the relative angle between the driver and the over-running indicator structure. The driver is thus visually alerted by the arcuate transmission of colored light of the optimal gear shifting time to acquire the best power from engine.

The over-running indicator structure of the present invention further offers the following advantages over the prior art:

1. The present invention utilizes the light transmissive upper housing to transmit an ineluctable visual effect to make the driver readily aware of the optimal shifting time to realize the best power from engine.
2. The present invention utilizes the arcuate light transmissive upper housing to produce an ineluctable visual effect such that the driver feels little if any constraint in setting an effective angle when mounting the present invention.

Many changes and modifications to the above-described embodiment of the subject invention can, of course, be carried out without departing from the scope thereof. Accordingly, the invention is intended to be limited only by the scope of the appended claims.

What is claimed is:

1. An over-running indicator structure for an automobile comprising:

an upper housing substantially hemispherical in shape and light-transmissive, with a bottom of said upper housing being provided with at least a pair of thread holes adapted to reversibly receive a bottom screw therein;

a lower housing, with an inner surface of said lower housing being formed with a plurality of hollow threaded ribs in close proximity to a rim of said lower housing, the inner surface of said hollow threaded rib being formed with a screw thread adapted to reversibly receive a top screw therein, the rim of said lower housing further being configured with a screw hole;

a pair of mounting legs in fixed continuity with and extending downward from the bottom of said lower housing, each of said mounting legs formed with a mounting hole therethrough;

a circuit board with a plurality of board holes disposed along an outer perimeter and fixedly seated on said lower housing so that said screw holes align with said hollow thread ribs of said lower housing, said circuit board further provided with a light emitter, a data screen and a plurality of control buttons, and adapted to connect to an electronic data transmission cable, wherein the circuit board is fixedly seated in the lower housing adjacent the rim by a plurality of top screws being rotatingly advanced through the board holes and respectively into said plurality of hollow threaded ribs, said upper housing and lower housing being firmly connected to each other by rotatingly advancing at least a pair of bottom screws through the screw holes on the rim of said lower housing and into the respective thread holes of the upper housing;

a mounting support provided in a preferred embodiment with a plurality of base through holes;

a pair of mounting brackets formed on said mounting support and extending upward therefrom to juxtapose respectively with the corresponding pair of mounting legs so as to align the pair of mounting holes respectively with a pair of axle hole formed through said mounting brackets, said paired axle holes and paired mounting holes adapted to reversibly accept a bolt-like axle therethrough, thereby connecting said lower housing and said mounting supports wherein a user rotates the lower housing with respect to the mounting support and tightens said bolt-like axle to fixedly maintain a chosen configuration of said over-running indicator structure.

2. The over-running indicator structure according to claim 1, wherein said circuit board further comprises at least one color changeable light emitter.

* * * * *